(12) United States Patent
Schabel et al.

(10) Patent No.: US 12,366,412 B2
(45) Date of Patent: Jul. 22, 2025

(54) PLASTIC CONVERSION FEED SYSTEM

(71) Applicant: RES POLYFLOW LLC, San Francisco, CA (US)

(72) Inventors: Jay Schabel, Hiram, OH (US); George W. Strekal, Conneaut, OH (US); Richard A. Schwarz, Akron, OH (US); Mehmet A. Gencer, Brecksville, OH (US); Richard K. Peterson, Huntertown, IN (US); Cassten Everidge, Hudson, IN (US); Laura Christine Strong, Fort Wayne, IN (US)

(73) Assignee: RES Polyflow LLC, San Francisco, CA (US)

( * ) Notice: Subject to any disclaimer, the term of this patent is extended or adjusted under 35 U.S.C. 154(b) by 567 days.

(21) Appl. No.: 17/411,774

(22) Filed: Aug. 25, 2021

(65) Prior Publication Data

US 2022/0065535 A1    Mar. 3, 2022

Related U.S. Application Data

(60) Provisional application No. 63/071,396, filed on Aug. 28, 2020.

(51) Int. Cl.
    *B01J 4/00* (2006.01)
    *B01J 6/00* (2006.01)
    (Continued)

(52) U.S. Cl.
    CPC ............... *F27D 3/08* (2013.01); *B01J 4/001* (2013.01); *B01J 6/008* (2013.01); *C10G 1/10* (2013.01);
    (Continued)

(58) Field of Classification Search
    CPC .... F27D 3/08; F27D 13/00; F27D 2003/0071; B01J 4/001; B01J 6/008; B01J 2204/002;
    (Continued)

(56) References Cited

U.S. PATENT DOCUMENTS 3,246,594 A    4/1966  Fisher
3,497,324 A *  2/1970  Loewen .................... C09C 1/50
                                                422/150
(Continued)

FOREIGN PATENT DOCUMENTS

EP    1647589 A2    4/2006
EP    2457977 A2    5/2012
(Continued)

OTHER PUBLICATIONS

Dai (Progress in Energy and Combustion Science, 2012) (Year: 2012).*

(Continued)

*Primary Examiner* — Alison L Hindenlang
*Assistant Examiner* — Erica Hartsell Funk
(74) *Attorney, Agent, or Firm* — Hudak, Shunk & Farine Co. LPA

(57) ABSTRACT

A plastic conversion feeding system serves to transport a feedstock through different processing units or stations to a vessel wherein chemical and/or physical reactions occur to produce suitable, useful end products. Various processing units include a homogenizer for breaking up said feedstock, a size reduction device for reducing the feedstock to particles and densifying the same, a heating and/or blending device for heating said feedstock, and a feed conduit connecting said heating and blending device to said vessel. The feedstock conversion unit vessel through various cracking, (Continued)

reforming, condensation, recombination, and recracking operations, produces a mixture of useful gases and condensable gases.

23 Claims, 4 Drawing Sheets

(51) Int. Cl.
    C10G 1/10    (2006.01)
    F27D 3/08    (2006.01)
    F27D 13/00   (2006.01)
    F27D 3/00    (2006.01)
(52) U.S. Cl.
    CPC ......... F27D 13/00 (2013.01); B01J 2204/002 (2013.01); B01J 2204/007 (2013.01); C10G 2300/1003 (2013.01); F27D 2003/0071 (2013.01)
(58) Field of Classification Search
    CPC ................ B01J 2204/007; C10G 1/10; C10G 2300/1003; B29C 64/357
    See application file for complete search history.

(56) References Cited

U.S. PATENT DOCUMENTS

| | | | |
|---|---|---|---|
| 4,720,251 | A | 1/1988 | Mallay et al. |
| 5,057,189 | A | 10/1991 | Apffel |
| 5,889,113 | A | 3/1999 | Mori et al. |
| 5,938,994 | A | 8/1999 | English et al. |
| 6,692,544 | B1 | 2/2004 | Grillenzoni |
| 8,282,787 | B2 | 10/2012 | Tucker |
| 8,562,915 | B2 | 10/2013 | Yeh et al. |
| 9,771,536 | B2 | 9/2017 | White |
| 2007/0266623 | A1* | 11/2007 | Paoluccio ............... C10L 5/44 44/629 |
| 2011/0219679 | A1 | 9/2011 | Budarin et al. |
| 2012/0317878 | A1 | 12/2012 | Taulbee |
| 2013/0197182 | A1 | 8/2013 | Hosokawa et al. |
| 2014/0296586 | A1* | 10/2014 | Chandran ............... C10J 3/482 252/373 |
| 2016/0002554 | A1 | 1/2016 | Tumuluru |
| 2016/0017232 | A1 | 1/2016 | Ullom |
| 2016/0045841 | A1* | 2/2016 | Kaplan ................. C01B 32/05 429/49 |
| 2016/0122673 | A1 | 5/2016 | White |
| 2017/0283706 | A1 | 10/2017 | Schabel et al. |
| 2018/0010050 | A1 | 1/2018 | Van Der Ree et al. |

FOREIGN PATENT DOCUMENTS

| | | |
|---|---|---|
| JP | 8-5034 A | 1/1996 |
| JP | 10-245568 A | 9/1998 |
| JP | 2001232634 A | 8/2001 |
| JP | 2011006619 A | 1/2011 |
| JP | 2011-236337 A | 11/2011 |
| KR | 10-2003-0075235 A | 9/2003 |
| WO | 2016042213 A1 | 3/2016 |

OTHER PUBLICATIONS

Sauceau (Progress in Polymer Science, 2011) (Year: 2011).*
Goodship (Science Progress 2007 90:4, 245-268) (Year: 2007).*
European Search Report for corresponding European Application 21862706.5 dated Aug. 30, 2024.
Second Office Action dated Oct. 29, 2024 for corresponding Japanese Application 2023-513135.
Korean Office Action dated Apr. 17, 2025 for corresponding Korean Application 10-2023-7007333.
Japanese Search Report for corresponding Japanese Application 2023-513135 dated Mar. 1, 2024.

* cited by examiner

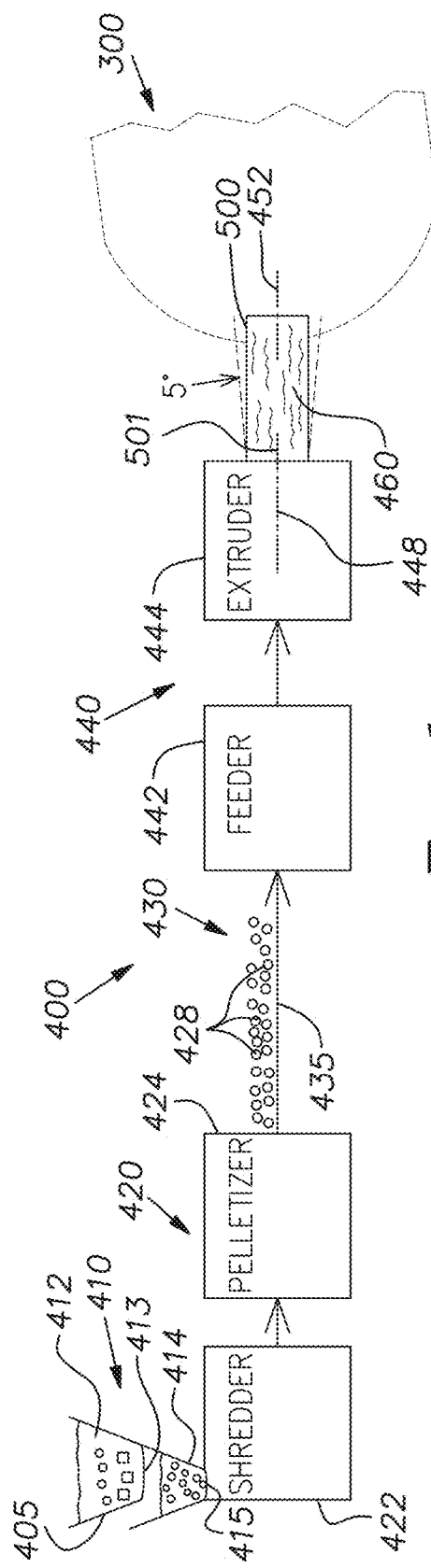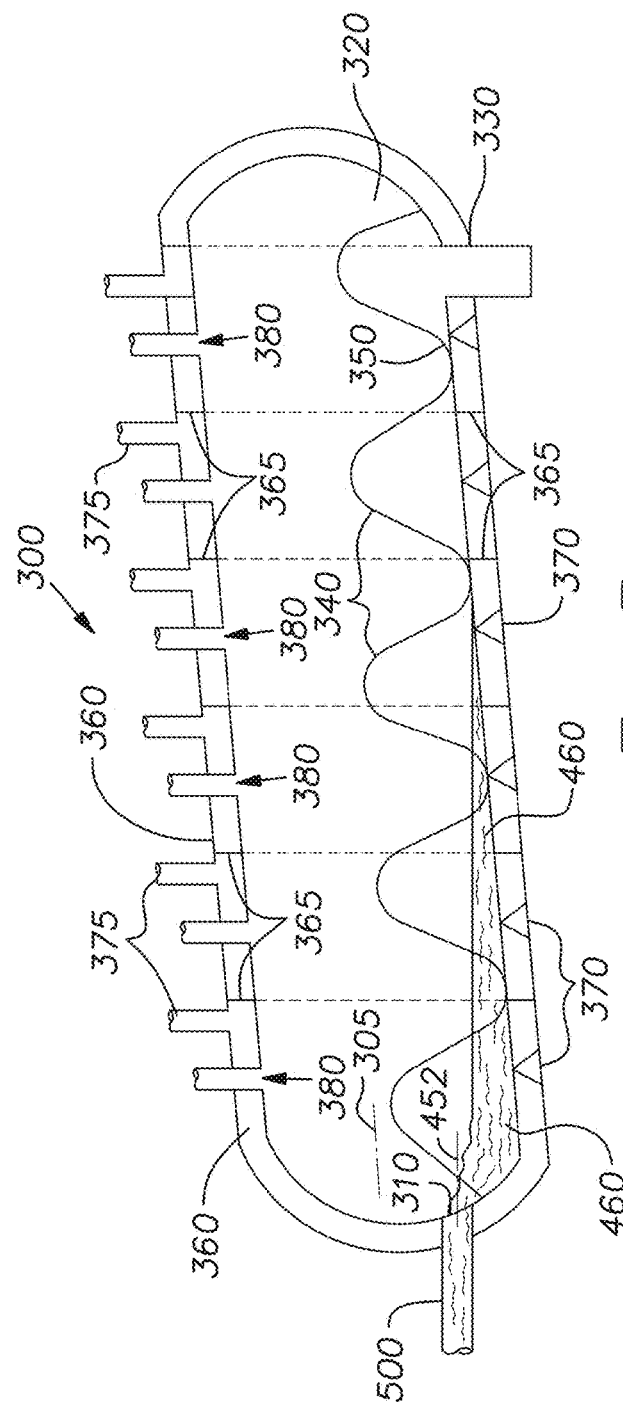

PLASTIC CONVERSION FEED SYSTEM

FIELD OF THE INVENTION

The present invention relates to a plastic conversion feed system for transporting shredded and/or pelletized solid feedstock comprising plastic or hydrocarbonaceous material, or any combination thereof to a vessel wherein usable compounds are produced under controlled chemical and physical reactions, desirably in the absence of air and/or oxygen. It also relates to a modified plastic conversion feed system for transporting desirably homogenized plastic feedstock or hydrocarbonaceous feedstock, or any combination thereof, desirably in the form of a briquettes, and/or cubic mass to an extruder wherein it is fed as a solid or semi-solid feedstock to a reactor.

BACKGROUND OF THE INVENTION

U.S. Publication 2017/0283706 relates to a process and an apparatus for pyrolysis of mixed plastic feedstock producing petroleum products. In one example, a process for producing petroleum products includes charging feedstock of mixed polymer materials into a reactor apparatus. Heat energy is applied to the feedstock while advancing the feedstock through the vessel apparatus in an anaerobic operation. The energy input to the reactor apparatus is controlled by controlling a temperature gradient within the reactor vessel to produce petroleum gas product. The process involves in situ chemical reactions comprising cracking and recombination reactions that are controlled to convert solid hydrocarbonaceous portion of the feedstock to molten fluids and gases inside the reactor vessel and to produce gaseous petroleum products which exit the reactor vessel. The separated solid residue from the pyrolysis process is also removed from the reactions vessel.

WO 2016/042213 A1 relates to a pyrolysis apparatus and a pyrolysis method. The pyrolysis apparatus is a continuous apparatus so that material to be pyrolyzed is conveyed through the apparatus. The pyrolysis apparatus has at least two control parts, through which material to be pyrolyzed is conveyed. In at least two different control parts, the material is subjected to thermal effects of a different magnitude. In addition, gas evaporated from the material is recovered from at least two control parts.

US 2016/017232 A1 relates to an apparatus and method for pyrolyzing hydrocarbonaceous materials to produce useful vapor and solid products comprising a generally cylindrical, linear reactor having a screw means for transporting hydrocarbonaceous materials through said reactor, means for feeding and heating said hydrocarbonaceous materials whereby they are processed and pyrolyzed to produce vapor and solid products; means for removing vapor products from said processed hydrocarbonaceous materials, means for removing solid products, means whereby said hydrocarbonaceous material is maintained within a zone for a range of defined residence times, means for rotating said screw, which has a plurality of flight configurations for compressing, and for melting said hydrocarbonaceous materials to convert them from a solid to a liquid, for mixing, destabilizing and dehalogenating said hydrocarbonaceous materials, for pyrolyzing said hydrocarbonaceous materials, for devolatilizing the pyrolyzed hydrocarbonaceous materials, and for discharging solid products.

EP 2457977 A2 relates to various embodiments of a process for pyrolyzing hydrocarbonaceous material. In one embodiment the process for pyrolyzing hydrocarbonaceous material includes charging a reactor with a feed material comprising hydrocarbonaceous material, heating the feed material, and collecting liquid product from the reactor which is anaerobic in operation. At least 5% of the organic carbon atoms which are not present in an aromatic ring of a compound of the feed material are present in an aromatic ring of a compound in a liquid portion of the product.

EP 1647589 A2 relates to a successive pyrolysis system of waste synthetic-highly polymerized compound for successively pyrolyzing combustible waste by indirect heating at a pyrolysis chamber maintaining an anaerobic or hypoxic environment, and producing refined oil like heavy oil and light oil according to boiling points at a distillation column to be used as heat source for the pyrolysis of the waste. The successive pyrolysis system comprises a hopper; an automatic waste injection device, which discharges a predetermined amount of waste from the hopper; a pyrolysis chamber for maintaining a high-temperature and hypoxic environment, and successively pyrolyzing the waste by indirect heating; a gas burning chamber for burning non-condensable gas among pyrolysis gas produced at the time of the pyrolysis of the waste, and providing heat of a predetermined temperature to the outer surface of the pyrolysis chamber to be used as heat source for the pyrolysis of the waste; a refined oil producing means for producing refined oil from the pyrolysis gas reformed after going through catalyst reaction and providing residual non-condensable gas to the gas burning chamber; and an automatic discharging device for successively discharging ashes transported after being pyrolyzed from the pyrolysis chamber.

U.S. Pat. No. 5,057,189 A relates to an apparatus for recovering char, oil and fuel gas from vehicle tires is disclosed, for either whole tires or physically fragmented tires. The tires may be washed to remove dirt and road film. The tires are dried and preheated with super-heat steam. The hot tires are pyrolyzed to partially devolatize a major portion of the hydrocarbons and produce a char that can be separated from the steel and fiber glass. The char may be subsequently pyrolyzed with microwaves that elevate the tire temperature and devolatize the remaining hydrocarbons from the char as gas. The hot gases are cooled and partially condensed. The uncondensed gas is used as fuel. The condensed oil is sent to storage. The solid residue from the tire pyrolysis is substantially char, fiberglass and steel. The char is mechanically separated from the glass and steel. Alternately, the char and the glass and steel are separated by dumping the hot mixture into a water quench tank. The mixture is cooled. The char floats to the water surface and is removed. The glass and steel sink to the bottom of the tank and are removed separately. The char may be sold or burned or milled to break down agglomerates and subsequently pelletized and bagged. The steel and glass are discarded as trash.

U.S. Pat. No. 8,282,787 relates to a system and process for gasification of a carbonaceous feedstock using pyrolysis to produce a gas product, which may include methane, ethane, and other desirable hydrocarbon gases, and a solids product, which includes activated carbon or carbon. The gas product may then be filtered using at least a portion of the activated carbon from the solids product as a filtering medium. In an embodiment, at least some of the noxious chemicals are sequestered or removed from the gas product in one or more filtering steps using the activated carbon as a filtering medium. In a further embodiment, the filtering steps are performed in stages using activated carbon at different temperatures. A high-temperature pyrolysis system that produces activated carbon may be combined with another high-temperature pyrolysis system that does not produce activated carbon to provide filtering of noxious compounds using activated carbon from the first high-temperature pyrolysis system. A high-temperature pyrolysis system may be combined with one or more low-temperature feedstock conversion processes such that waste heat from the high-temperature pyrolysis system is used to operate the low-temperature process. A non-wetting carbon having pores fused with silica can be produced from using the system and process.

SUMMARY OF THE INVENTION

A feedstock conversion feed system serves to transport a feedstock through different processing units or stations to a reactor vessel wherein chemical and/or physical reactions occur to produce suitable, useful end products. Various processing units include a size reduction device such as one or more shredders, or one or more pelletizers, or a combination of both. Desirably, the feedstock is often shredded first followed by pelletization thereof. The pelletizing unit operation generally reduces the feedstock and densities the same. Another processing unit of the present invention include heating and blending devices that can be one or more feeders and/or one or more extruders, or both. Various different types of feeders can be utilized wherein some include a ram, or a chain conveyor, a helical screw, and the like. The one or more extruders can generally be any type of extruder known to the literature and to the art, such as a single screw extruder, or a twin screw extruder that generally is preferred.

In another embodiment, a conversion feed system transports the feedstock through various stages to a pyrolytic reactor that also produces stable, useful end products as set forth hereinbelow. The various processing units include a homogenizer that generally does not shred, but rather breaks up, separates, or forces apart typically compressed feedstock that is generally subsequently mixed or blended so that the feedstock generally contains similar types of specific plastics, carbonaceous material, or any combination thereof. Such feedstock is then fed to a shredder that further separates the feedstock and then to a pelletizer that desirably forms small briquettes, a cubic mass, etc. of feedstock, that is then heated and fed to an extruder whereby a solid or semi-solid mass therefrom is fed to a pyrolytic reactor.

A plastic conversion feed system for transporting a feedstock to a reactor vessel, comprises a homogenizer capable of breaking up feedstock comprising plastic material or hydrocarbonaceous material or any combination thereof; a pelletizer capable of reducing the size and densifying said homogenized feedstock; and an extruder capable of forming a continuous mass of feedstock that is fed to said reactor vessel.

A process for transporting a feedstock to a reactor vessel comprising: breaking up said feedstock in a homogenizer, said feedstock comprising a plastic, a hydrocarbonaceous material, or any combination thereof; a pelletizer, said pelletizer reducing the size of said feedstock; an extruder, and a feed conduit operatively connecting said extruder to said reactor, and extruding said feedstock into said reactor.

A plastic conversion feed system for transporting a feedstock to a reactor vessel, comprising a size reduction device capable of reducing the size of and densifying said feedstock comprising a plastic, or a hydrocarbonaceous material, or any combination thereof; a heating device capable of heating and transferring said reduced sized feedstock to an extruder, said extruder having an output axis; and a conduit connecting said extruder to said vessel, and capable of feeding said feedstock to said vessel, and said conduit optionally having an output axis of up to about a 5° radius angle with respect to said extruder device output axis.

A process for transporting a feedstock to a reactor vessel comprising the steps of reducing the size of said feedstock, in a size reduction device, said feedstock comprising a plastic, or a hydrocarbonaceous material, or any combination thereof; heating and blending said reduced size feedstock; transferring said reduced size feedstock to a feed conduit, wherein said feed conduit is connected to said vessel, and feeding said reduced size feedstock to said vessel.

BRIEF DESCRIPTION OF THE DRAWINGS

The foregoing and other features of the present invention will become apparent to those skilled in the art to which the present disclosure relates upon reading the following description with reference to the accompanying drawings, in which:

FIG. 1 is a schematic view of a plastic conversion feed system for feeding hydrocarbonaceous material and/or plastic polymers to a size reduction device such as a shredder and/or pelletizer and subsequently to a heating and blending device such as a feeder and/or an extruder for preparing a suitable feedstock for a vessel wherein chemical and/or physical reactions take place;

FIG. 2 is a schematic view of a vessel wherein various reactions can occur;

DETAILED DESCRIPTION OF THE INVENTION

Feedstock Conversion Unit (FCU)

Figure 3:
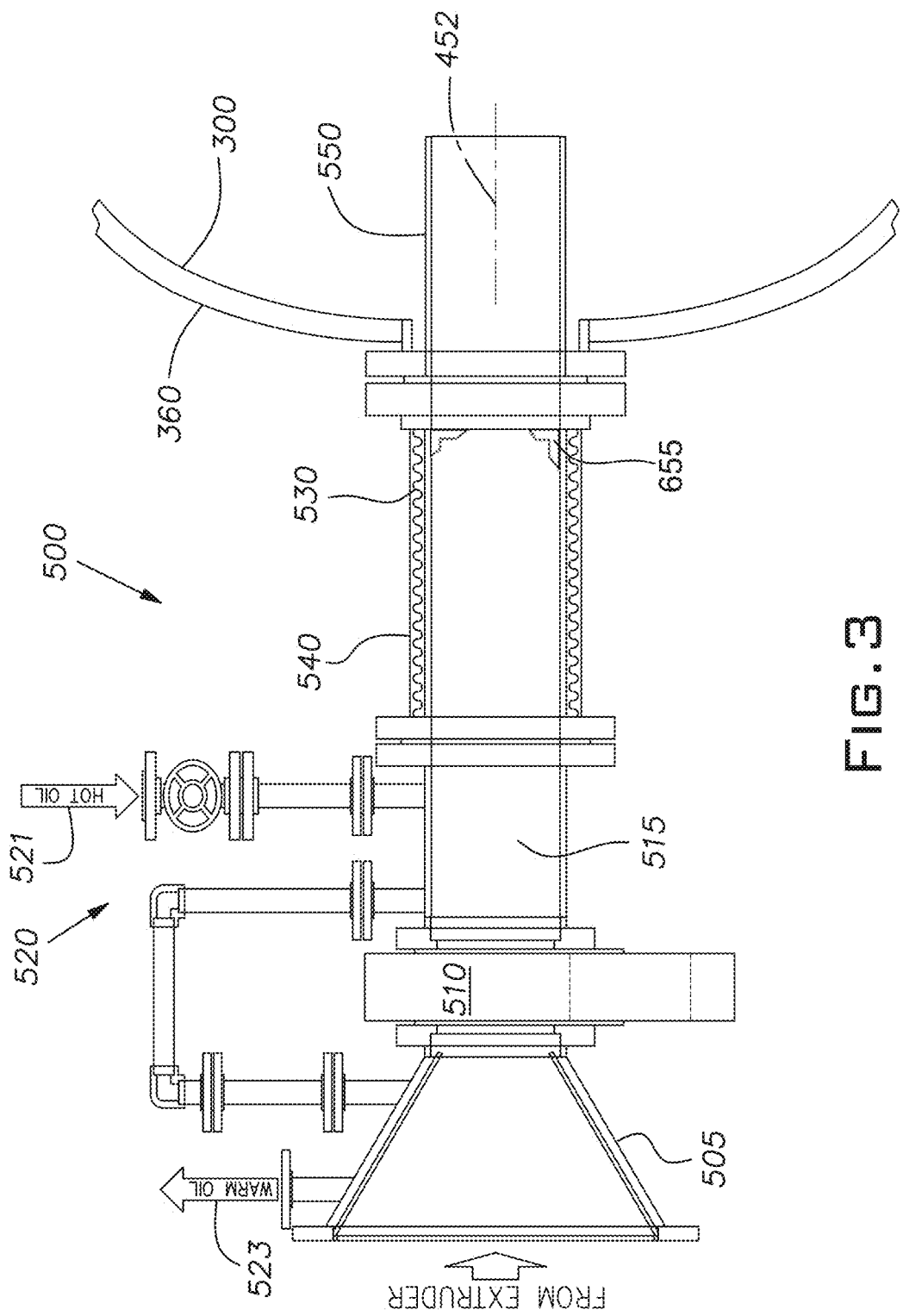
FIG. 3 is a side elevation view of the feed conduit that transfers the feedstock from the feeder and/or extruder to the vessel.

Vessel 300 of the present invention can generally be any vessel, known to the art or to the literature wherein physical and/or chemical reactions can occur, and desirably is substantially free of air and oxygen. That is, the total amount of oxygen based upon the total internal volume of the vessel is less than about 3 volume percent, desirably less than about 2 volume percent, and preferably less than about 1 volume percent, and more preferably it is totally free of any air or oxygen. Hence, reactor vessels such as pyrolytic vessels can be utilized. The vessel can generally have multiple heating units, multiple reaction stages, multiple product gas exhaust vents, and the like, or any combination thereof. Optionally, but preferably, vessel 300 contains an outer shroud 360 having a plurality of inner walls 365 that extend from the shroud to the vessel exterior wall and forms heated channels for hot gases to heat the vessel. A preferred vessel that is schematically shown in FIG. 2 is described in U.S. Pat. No. 10,711,202 B2 issued Jul. 14, 2020 and is hereby fully incorporated by reference with regard to all aspects thereof. As well known to the art and to the literature, various pyrolytic vessels break down various substances, compounds, and material through various reactions such as cracking, reforming, recombination, and recracking, and the like to generally yield various gases such as alkane gases, or various hydrocarbon gases such as naphtha, or various gas oils such as heavy oil, as well as diesel fuel, jet fuel, maritime fuel, various waxes, lubricants, additives, various distillates, light weight organic compounds, and the like.

Feedstock conversion feed system 400 contains different processing units or stations. The feedstock material is generally a plastic, or hydrocarbonaceous material 405, or any combination thereof, that is fed to particle size reduction device 420 by hopper system 410. The hopper system comprises an upper, large hopper 412 that receives large amounts of feedstock and upon receiving an electronic signal from lower and smaller hopper 414 that it is low on feedstock, opens an orifice device such as bottom valve 413 and transfers feedstock (e.g. fills) to lower hopper 414. Lower hopper 414 has an orifice such as a lower valve 415 therein that can transfer, convey or deliver at a constant rate or a steady state amount of waste material into size reduction device 420. In a manner well known to the art and to the literature, the lower hopper feed valve can be programmed to increase or decrease the amount of waste feedstock admitted to size reduction device 420 in order to stabilize, and generally equalize the flow of subsequently reduced size solid feedstock or semi-molten or molten feedstock into FCU vessel 300.

A desirable aspect of vessel 300 is to generally produce petroleum gas products. Preferable plastic waste feedstock items include waste polymers, as in the form of sheets, wrappers, packaging, furniture, plastic housings, containers, waste plastics, and the like, and are utilized that essentially contain only hydrogen and carbon atoms such as polyethylene, high density polyethylene, low density polyethylene, linear low density polyethylene, polypropylene, polystyrene, and the like. Other suitable commercial polymers include polyesters, polycarbonates, polymethyl methacrylates, nylons, polybutylene, acrylonitrile-butadiene-styrene (ABS) copolymers, polyurethanes, polyethers, poly(oxides), poly(sulfides), polyarylates, polyetherketones, polyetherimides, polysulfones, polyvinyl alcohols; and polymers formed by polymerization of dienes, vinyl esters, acrylates, acrylonitrile, methacrylates, methacrylonitrile, diacids, diols, or lactones, or any combination thereof. Still other polymers include block copolymers of the preceding, and alloys thereof. Polymer materials can also include thermoset polymers such as, for example, epoxy resins, phenolic resins, melamine resins, alkyd resins, vinyl ester resins, crosslinked polyester resins, crosslinked polyurethanes; and also crosslinked elastomers, including but not limited to, polyisoprene, polybutadiene, polystyrene-butadiene, polystyrene-isoprene, polyethylene-propylene, ethylene-propylene-diene, and the like, and blends thereof.

Hydrocarbonaceous material generally includes compounds that have, of course, primarily only carbon and hydrogen atoms such as various bitumens including bitumen tailings as from a mine, various heavy fractions of a fractionating column that include various heavy oils, greases, semi-asphalt compounds, and the like, that by the present invention, are reduced to lighter components, and are mostly various types of hydrocarbon containing gases.

The various above-noted polymer feedstocks often include fillers, pigments, flame retardants, clay, and the like. Generally, the amount thereof is about 2% to about 25% by weight, or desirably about 3% to about 20% by weight, or preferably about 3% to about 15% by weight, or most preferably less than about 7% by weight, all based on the total weight of the one or more polymer feedstocks. Such compounds generally are not chemically or physically reacted but are emitted from vessel 300 as through vessel discharge channel 330, often as solid inert residues.

In a preferred embodiment, the above different types of feedstock compositions often comprise from about 40% to about 90%, desirably from about 50% to about 85%, and preferably from about 70% to about 80% by weight, of polymers of polyethylenes, polypropylenes and polystyrenes. Any remaining polymers can be, but are not limited to, polyurethane, nylon, PET, and polyvinylchloride, as well as any of the remaining above-noted polymers.

Processing size reduction device 420 comprises one or more shredders 422 and/or one or more pelletizers 424, While they can be in any order, preferably the feedstock is shredded first and then subsequently pelletized as shown in FIG. 1. The shredder and pelletizer can be located spaced apart from one another, adjacent or contiguous to one another, or even integral, i.e., one combined unit. Preferably they are spaced apart a short distance whereby there is a direct feed, from shredder 422 to pelletizer 424. Shredder 422 can comprise any conventional shredder known to the art and to the literature that generally reduces the size of the feedstock in one more stages to small particles. Similarly, pelletizer 424 can be any conventional pelletizer known to the literature and to the art that reduces the size of feedstock 405 in one or more stages and preferably also densifies the same to small particles 428. The reduced size of the densified, individual plastic pelletized feedstock 428, generally are formed into a sphere, block, cylindrical, or other random form, can vary widely in size such as from about 0.25 to about 6 inches, desirably from about 0.5 to about 5 inches, and preferably from about 1 to about 4 inches, and more preferably about 1 to 2 about inches. Feedstock 405 can optionally be heated in shredder and/or pelletizer 420, or in feed stream 430, e.g. as in an oven, not shown, by any conventional means known to the art and to the literature such as by hot air, hot oil, steam, or infrared light, electric heat, or mechanical working, and the like, and can vary widely in temperature as from about ambient, i.e. about 40° F. up to about 100° F., and even higher as up to about 160° F., or to below the melting temperature of the lower most plastic melting temperature. One advantage of densifying the waste, plastic, and/or carbonaceous waste is to produce a pelletized feed stream 430 having a desired density that is generally greater than about 15 or desirably greater than about 20 pounds per cubic foot, and also that feed stream 430 egressing from shredder 422 and/or pelletizer 424 has a reduced amount of air therein.

The reduced sized waste feed, in the form of feed stream 430, as on conveyor 435 is fed to another processing unit, heating and blending device 440. Device 440 comprises one or more feeding units and/or one or more extruders. The feeder and/or extruders can be in any order with preferably a feeder being first with subsequently a single downstream extruder as shown in FIG. 1. The two separate units can be located spaced apart from one another, or adjacent, or contiguous with regard to one another, or even an integrated device of the same. A feed device located adjacent to the extruder, as shown in FIG. 1 is preferred with the shredded and/or pelletized feedstock being fed directly from feeder 442 to extruder 444. Feeder 442 can generally be any conventional feeder known to the art and to the literature that feeds an optionally but desirably also heats the feedstock. Feeder 442 can contain a piston ring, or a conveyor, or a helical screw, not shown, that typically directly heats, and transfers the feedstock directly into extruder 444 or feed conduit 500. Similarly, extruder 444 can be any conventional extruder known to the literature and to the art that generally heats and transfers the various feedstock materials, e.g. shredded and/or pelletized, to vessel 300. Alternatively and desirably, the extruder heats and densities the feedstock particles and generally convert it to a semi molten or molten flowable,or preferably non-molted, mass and feeds the same to conduit 500. Suitable temperatures of feedstock 460 egressing from feeder 442 and/or extruder 444 can range from about 200° F. to about 300° F. or to about 400° F., and even about 500° F., or with desired ranges being from about 250° F. to about 400° F., and from about 300° F. to about 350° F. A twin screw extruder 444 in this embodiment is preferred that desirably contains jacketed barrels and internal ported screws to allow for the use of a hot heating medium such as hot oil and the like. Moreover, independent heating sections of the barrels allow careful control of the feed stream mass temperatures.

Another favorable aspect of utilizing an extruder is that densification of the feed stream there from (egress) can be readily increased to its fully dense state that generally is greater than about 25 pounds per cubic food and desirably from about 30 to about 38 pounds per cubic foot. Such increased density further eliminates and generally ensures minimum intrusion of air into any FCU vessel 300 via the feedstock.

Another important aspect of the present invention is the utilization of a processing unit that is feed conduit 500 that extends from extruder 444 into said vessel 300 and transfers said feedstock from the extruder into the vessel, and can be made out of any conventional type of metal such as stainless steel, cast iron, or carbon steel. This device is generally a flexible conduit or pipe having a smooth interior that connects the output of feeder 442 and/or extruder 444 to FCU vessel 300 and ensures that a steady rate and smooth flow of feedstock, or semi-molten, and/or molten feedstock waste material is fed into the vessel, regardless of the vessel input location, e.g., height, distance, lateral location, etc., with respect to the feeder and/or extruder outlet. Feed conduit output or axis 452 that can be exactly aligned with or is capable of generally moving in a moderate radial direction with regard to extruder output axis 448. That is, optionally it can move vertically, i.e., up or down, or sideways, i.e. left or right, or any combination thereof within about a radial angle of up to about 5° with respect to the output axis 448 of the extruder and desirably within an angle of about 3° or less. Axis 452 of conduit 500 can be perpendicular to the ingress face of the feed conduit. Optionally, the entire conduit can be located within a flexible tube to permit angular movement of the feed into the vessel. Such movement readily permits the shredded or pelletized or semi-molten or molten waste feed stream from extruder 444 to be transferred to ingress 310 of vessel 300 in a smooth, consistent, steady stream, and even flow rate. This is an important aspect because the vessel can then run at a steady reaction state of pyrolyzation, cracking, reforming, etc., whereby an efficient output of the various constituents of the shredded or pelletized flowable waste are generally converted to a gas such as a petroleum gas, and the like, as noted above. The length of conduit 500 can vary such as from about 24 to about 240 inches, and more desirable is from about 36 to about 120 inches. The length is adjusted to allow for plant layout considerations, but also to ensure adequate length for development of a vapor seal with the feedstock being fed into the reactor.

A detailed view of a preferred conduit 500 is shown in FIG. 3. The feeder or preferably the extruder feeds solid, semi-molten, or molten feedstock material to conduit 500 that is connected in any conventional manner to extruder 444 such as by nuts and bolts, welding, etc., as to a flange (not shown) of the extruder egress in such a manner so that it can rotate at a radial angle of to about 5° with respect to output axis 448 of extruder 444. In order to maintain the waste material as a flowable mass as it egresses from extruder 444, feed conduit 500 is generally heated in any conventional manner such as by hot oil, infrared heat, heating tape, and the like. Input hopper 505 has a jacket thereabout that can contain a hot gas such as air, hot oil, and the like. Hopper 505 is connected to slide valve 510 which can be a gate valve, ball valve or any other type of valve that can readily shut off the flow of feedstock material to vessel 300. Subsequently, any trapped material will have to be reheated such as upon restart of the feedstock conversion feed system. As shown in FIG. 3, feed conduit 500 has an extension tube 515 that connects valve 510 to flexible tube 530 that is connected to vessel 300. In order to maintain the waste material in a flowable state in feed conduit 500, hot oil can be added to heating pipe system 520 via input 521 that can contain a valve that is connected to extension tube 515 that has a heating jacket thereabout. The heating fluid is a counter-current flow that exits extension tube 515 and is circulated by valve 510 and applied to input hopper 505, also in a counter-current flow, and exits through warm oil outlet 523 therefrom. Flexible tube 530 desirably contains flexible insulation 540 in order to maintain the waste material in a semi-molten state. Thus, feedstock waste material is fed to vessel 300, as through exit feed delivery tube 550 or feed conduit 500.

Another advantage of conduit 500 is that it is flexible, meaning that the feed conduit axis 452 of conduit 500 can generally be substantially aligned with the horizontal axis 448 of extruder 444 at one end, and at the other end is generally substantially aligned parallel with the input axis 305 of the ingress of vessel 300 as when it is at a slightly different location, e.g. vertically, horizontally, etc.

Conduit 500 can be supported as by any conventional scaffold or other support device or alternatively, it can be suspended from an overhead truss system and the like. Feed transfer pipe or conduit 500 can be capable of feeding 2500-7500 lb/hr of material into the vessel.

In summary, advantages of the above plastic conversion feed stock 405 of FIG. 1 include a continuous or steady state flow of the waste feedstock stream with a minimum amount of entrained air or air intrusion into vessel 300. This is accomplished primarily by extruder 444 applying pressure to the feedstock as it is forced into vessel 300 whereby air and oxygen is squeezed out of the feedstock. Also, temperature and density of the feedstock is controlled. Minimum stress is also imposed on feed conduit 500. This is accomplished by an optional flexible bellow with a smaller inner pipe (not shown), allowing for angular flexing of the feed conduit system that results in extended life of the system. Moreover, the flexible feed conduit can account for changes in shape, length, and angle of the PCU vessel 300.

Vessel 300 desirably exists, that is, axis 305 thereof, optionally can be set at a slight upward slope or angle from a reference point of level ground (not a slope, hill, or any upward or downward grade of land) on which the vessel rests, i.e., at about 0° to about 10°, desirably from about 1° to about 5°, and preferably from about 1.5° to about 4°. Thus, when desired, complete pyrolyzation of the feedstock mass 460 can be achieved before any unreacted feedstock waste mass reaches the upper end or egress 320 of the vessel as shown in FIG. 2. In other words, efficient utilization of the vessel is an important aspect to prevent discharge of unreacted feedstock from the exit end of the vessel. As shown in FIG. 2, feedstock 460 initially fills the vessel a specific amount at the lowest part thereof and is heated and gradually moved through the vessel by a helical screw blade 340 and pyrolyzed and vaporized into components which undergo various cracking, condensation, reforming, and recombination (chemical and physical) reactions to produce a desired mixture of various hydrocarbon products.

Beach head point 350 is located on the vessel bottom upstream from the vessel ingress or opening 310 at a distance where the height of the vessel bottom is generally equal to the initial vertical height of the feedstock mass injected into the vessel. Point 350 should be approximately at least about 2%, desirably at least about 5%, and preferably at least about 10% of the distance from the vessel upper egress or discharge channel 330, based on the total length of the vessel.

The yield of gaseous product produced by the present invention is very high and is at least about 70 wt. %, desirably at least about 80 wt. %, and preferably at least about 85 wt. % or 90 wt. % of the feedstock admitted to the vessel. The remaining material is generally classified as a solid inert residue, that is dry, and often contains fillers and other inert material and is ejected from the upper or egress end 320 of vessel 300 through discharge channel 330.

A desired reaction vessel is set forth in FIG. 2 that is similar to the vessel set forth in U.S. Pat. No. 10,711,202, issued Jul. 14, 2020, hereby fully incorporated by reference. However, it is to be understood that many other types of vessels can exist. Vessel 300 does not rotate and does not contain any catalysts. That is, it is free thereof. Vessel 300 contains shroud 360 that substantially extends thereabout and preferably extends about the entire exterior area of vessel 300. A plurality of inner walls 365 connect shroud 360 to vessel 300 to form heating zones and/or reaction zones within the vessel. Heat is supplied to the vessel via standard or conventional heating units 370 that generally exist within each section of the vessel that is separated by an inner wall 365. The heat thus generally travels around the circumference (annulus) of the generally cylindrical vessel 300 and exits therefrom through heat exhaust channels 375 at the top of the vessel. The heat in the different sections of vessel 300 heat generally volatize feedstock 460 with the gases generated therefrom egressing from the vessel through product exhaust channels 380 where they are fed to a condensation unit, not shown, and can be in the form of many different types of products. Various preferred petroleum products include naphtha, distillate such as diesel, jet fuel, gas oils such as heavy oils, greases, semi-asphalt compounds, wax, steam cracked feed, and the like.

Pyrolization occurs during transfer of the mass 460 along the vessel as in FIG. 2 from input or ingress 310 to vessel upper end or 320 via cracking, recombination, reforming, recracking, and the like. Generally, suitable pyrolyzing temperatures in vessel 300 along axis 305, i.e., from left to right of FIG. 2, range from about 700° F. to about 1,200° F.

MODIFIED EMBODIMENT

Figure 4:
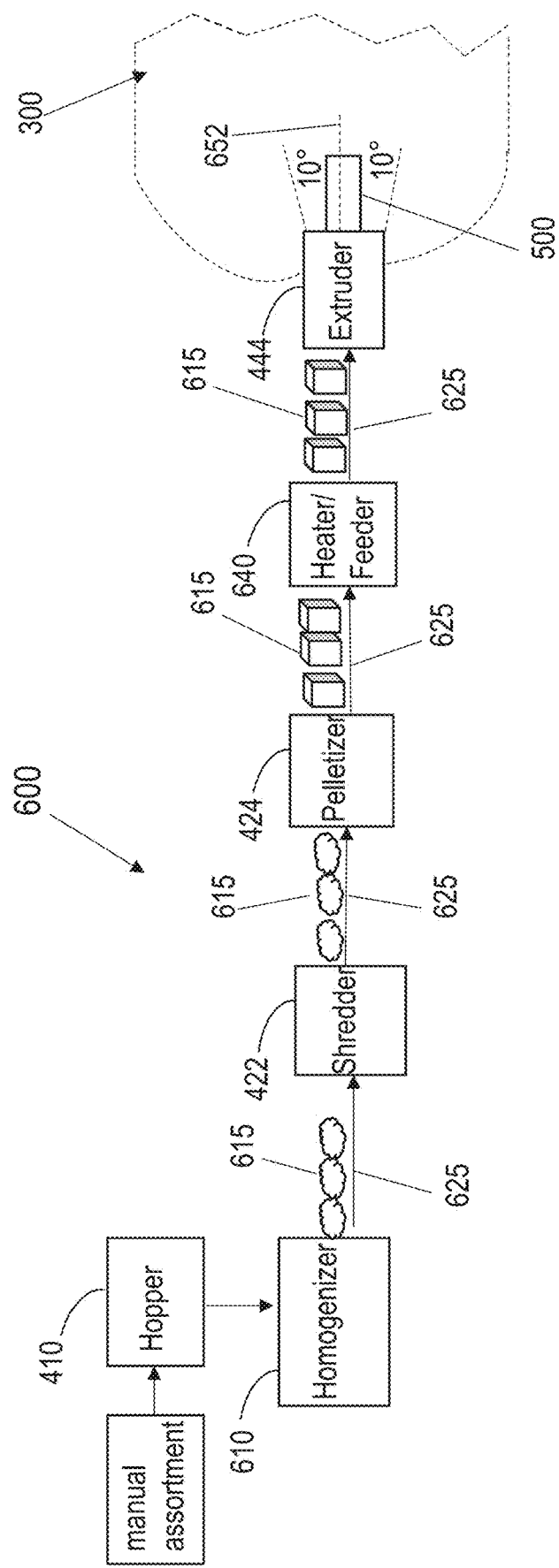
FIG. 4 is a schematic view of a different feed system of the present invention that transfers the feedstock from a homogenizer to a reactor vessel.

According to another embodiment of the present invention, a modified feed system 600 that is schematically set forth in FIG. 4 can be utilized to achieve a steady flow of the generally homogenized, pyrolytic feedstock into pyrolytic reactor 300, such as shown in FIG. 2. In this embodiment, the feedstock is not semi-molten or molten, that is melted, but desirably comprises solid particles or a solid mass that is desirably heated, and importantly, is flowable.

The recyclable materials received for pyrolyzation as from numerous sources such as food and grocery stores, drug stores, home improvement stores, mixed waste, city collection plants, as well as industrial sources generally contain a variety of materials some of which are not desirable for use in a pyrolytic reactor. Thus, as set forth in FIG. 4, manual assortment of such materials to remove the same from the waste feedstock 405 is carried out. Utilizing people, non-desirable pyrolytic feedstock items are separated out that include, but are not limited to, glass such as various beverage bottles, various types of cardboard and paper, as well as various metals such as beverage cans, beer cans, wood such as gameboards, toys, etc., as well as undesirable types of plastics such as polyvinylchloride.

Inasmuch as the one or more manual assortment areas will not have a constant influx of particular types of material, the amounts of feedstock from the individual manual assortment areas will vary and thus desirably needs to be regulated with respect to amount of the feedstock and type thereof to achieve a generally similar input of different type of plastics, as well as hydrocarbonaceous material. For example, if too many polyolefins such as polyethylene or polypropylene are contained in a first manual assorted feedstock, the amount of other or different polymers such as polystyrene, polyurethanes, polyesters, nylons, and the like, from another feedstock can be added thereto to generally maintain a similar overall input of the various different polymers, and hydrocarbonaceous material to homogenizer 610. This procedure is generally manually accomplished by taking different assortment area feedstock rich in one type of material and adding it to a feedstock low in said type of material.

The above-noted feedstocks are fed to hopper system 410 that is described hereinabove and hereby fully incorporated by reference. The hopper system can comprise the above noted upper and lower hoppers that preferably in this embodiment, are of the same size and generally convey or deliver the pyrolytic feedstock in a fairly constant or steady flow rate in order to stabilize, and equalize the flow of said feedstock to homogenizer 610. Also, the top hopper is important because it allows one to measure mass feed, and improves controllability of the process (pellets can be stored and replenished somewhat independently of the pyrolizer demand).

The purpose of homogenizer 610 is to break-up said feed stock and to ensure that generally a similar amount of specific feedstock materials are delivered to pyrolytic reactor 300 so that the output of various products from the pyrolizer such as various petroleum gas products that comprise naphtha, various distillates such as gasoline and the like, as well as various gas-oil compounds such as heavy gas and wax, diesel fuel, and the like are produced at a fairly constant rate by said pyrolytic reactor. The homogenized material flows into the pyrolytic reactor and thus ensure that a smooth production of the various noted end products will be produced and that the efficiency of the pyrolytic reactor is thus maximized reducing the various feed operations to ensure smooth running of the pyrolytic reactor, such as desired temperatures in each of the heating sections of the reactor, a generally desired flow rate of various end products from the product exhaust channels 380 of the reactor, and fairly constant heat input by the various heaters 370 of the reactor, and the like.

The homogenizer generally contains a rotating "breaker" shaft is designed to accept and mix the feedstock as from different assortment areas, so as to achieve a similar overall distribution of various polymers, etc., as noted above, without plugging the equipment or stopping the process. A common challenge of rotating equipment when exposed to film that exists in the feedstock is wrapping of the film around the rotating shaft, which increases energy requirements, or stops and or damages the equipment. The geometry of the breaker shaft is such that film does not easily wrap, that is it is free of low relief knobs and overhanging geometries that can catch film. Additionally, the bearings are free, i.e. guarded from film ingress. Optionally, a blade can be used to continuously cut film off the shaft, and/or the shaft can be reversible to "unload" wrapped film. In another system, a moving rake keeps the feed stream depth level. Such types of rotating equipment are known to the art and to the literature.

Subsequently, homogenized feed stream 615 is fed by any general transfer device such as conveyor belt 625 to the next unit operation that desirably is shredder 442. As noted above, shredder 442 basically is utilized to reduce the size of feedstock 405 and to break up clumps of feedstock. Such shredders, if they have a rotating shaft, rotate at a slow rate but has high torque to prevent feedstock film from clogging the system. Various shredders are known to the literature and to the art. Such shredders require low amounts of energy and promote a constant flow of feedstock so that it is easier to pelletize the same in the next unit operations step.

Down line from shredder 422 is pelletizer 424. As noted above, the primary purpose of the pelletizer is to reduce the size of feedstock 405 into smaller particles. Pelletizer 424 also densifies the feedstock generally in the form of briquettes and/or cubes having size of from about a half inch to about 3 or 4 inches and preferably from about 1 to 2 inches in size. Standard compacting or densifying machines can be utilized to produce the briquettes and/or cubes.

The next unit operation is the transfer the pellets to heater and feeder 640 wherein the noted briquettes and/or cubes, etc., is generally heated to temperatures of from about 50° F. or about 100° F. to about 400° F. or about 500° F., desirably from about 150° F. to about 300° F., and preferably from about 200° F. to about 250° F. These low temperatures are desired so that feedstock 460 can be easily transferred and then processed in an extruder without causing undo strain on the extruder apparatus. However, too much heat applied to the pelletized feedstock can cause high strain to the extruder apparatus and hence heating temperatures of about 500° F. or higher and especially 500° F. or higher are avoided. The heating and feeding apparatus can be a standard rotary kiln dryer and the like that are well known to the art and to the literature.

Subsequently, the next unit operation of the feed system is the utilization of extruder 444, the general purpose of which is to heat and densify the noted feedstock as in the form of briquettes or cubes to form a continuous mass or stream of feedstock that is egressed from the extruder into pyrolytic reactor 300 wherein it can be converted through cracking, recombination, and the like into various types of petroleum gases as noted above. An advantage of the process according to FIG. 4 is that the noted extruding temperatures result in the pellets wherein semi-molten, or molten form, are inherently, and subsequently able to form a physical plug 655 of material around conduit 500 at the entrance to pyrolytic reactor 300 to prevent the produced gases therein from flowing backwards, i.e. being regurgitated back into extruder 650. Generally any type of extruder can be utilized with a preferred type being a single screw extruder because it has the ability to create a plug around feed conduit 500 while transferring densified material at a necessary or desired feed rate. An important aspect of the present modified embodiment is that the feedstock material fed from the extruder into the pyrolytic reactor is generally in the form of a flowable material (mass) but is not molten, that is it is not melted. That is, it is in the form of flowable plastic and hydrocarbonaceous particles.

The amount of solid or softened feedstock material fed through extruder 650 into feed conduit 500 can range from about 25 to about 50 pounds per cubic foot and desirably from about 30 to about 45 pounds per cubic foot.

Feed conduit 500 is utilized to feed the solid or semi-solid feedstock from the extruder into pyrolytic reactor 300. Accordingly, the above description of the same is hereby fully incorporated by reference with regard to all aspects thereof unless otherwise, a different description is set forth herein. However, it is noted that the radial angle of the output axis of the feeder, that is output axis 652 of extruder can vary over a range up to about 10° and generally from about 1° to 7° and most preferably from about 1° to about 3°.

In order to achieve a consistent vapor seal, the compaction of flowing material can be adjusted by changing the cross sectional geometry of the feed pipe, or lengthening/shortening the feed pipe. One means of accomplishing this is by adding ports in the side of the feed tube where rod(s) can be inserted an adjustable depth into the flow of material, thereby increasing resistance to flow and increasing compaction of material in the feed pipe, which creates a tighter seal. The rods need to be robust enough to avoid deformation in the flow, and there needs to be a seal between the inside of the feed tube and the ambient environment. This seal can be any commonly used, such as a packing gland or mechanical seal designs. Common thread patterns are generally not sufficient to achieve a vapor seal while allowing for adjustability, but can be sealed with multiple fasteners such as nuts with or without gaskets.

Figure 5A:
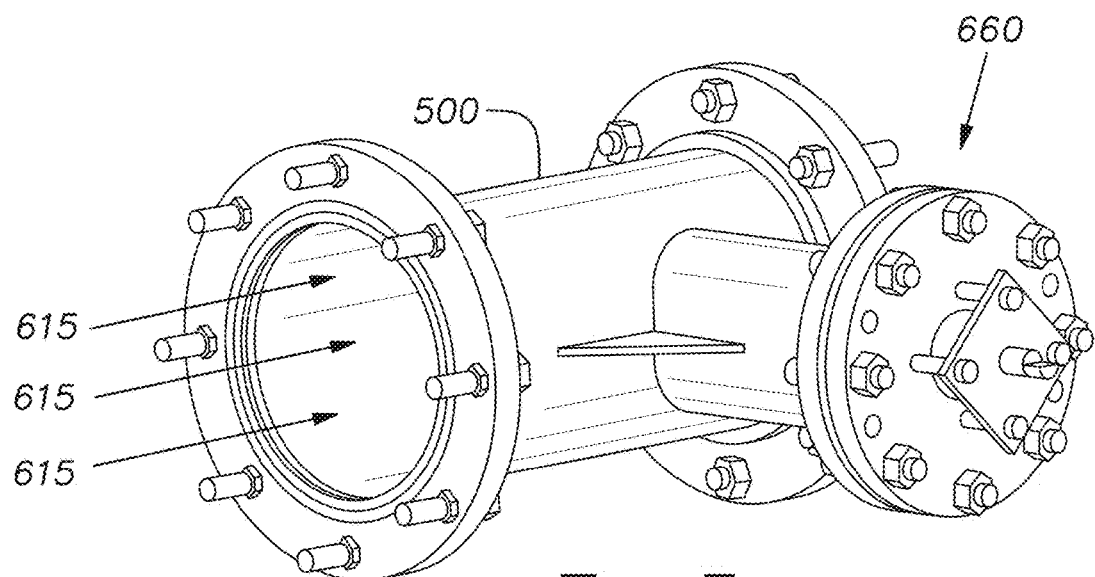
FIG. 5A is a perspective view of a adjust a plug that is fixedly attached to feed conduit generally at a perpendicular angle to the feed conduit.
Figure 5B:
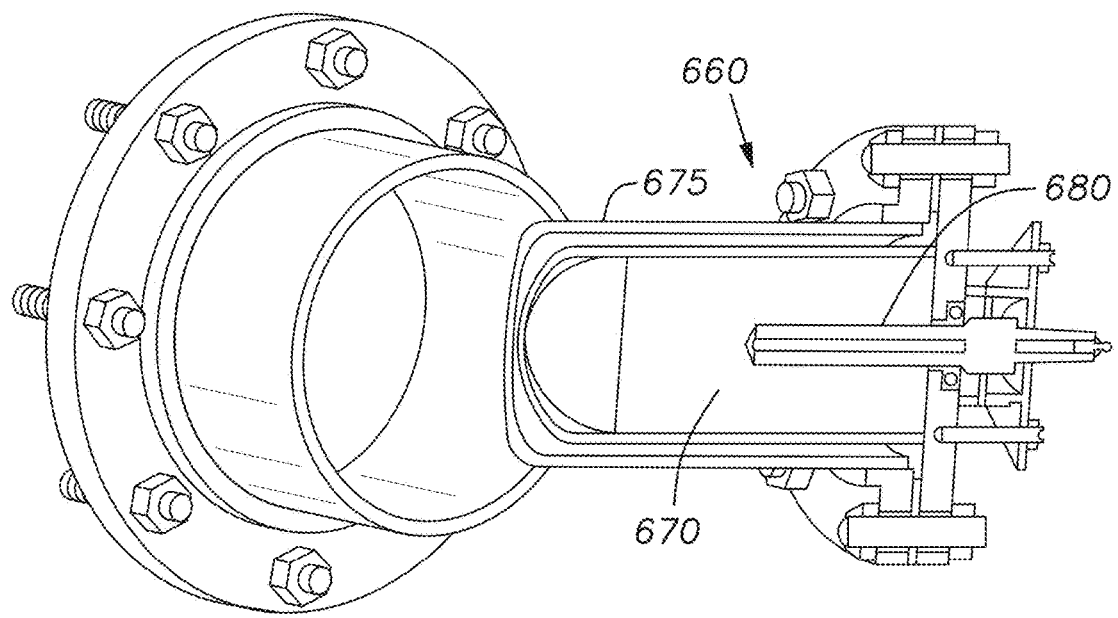
FIG. 5B is a perspective view showing a portion of the feed channel with the adjustaplug being at a right angle and partially extending into the feed channel.

More specifically, the present invention relates to the utilization of adjustaplug 660 as shown in FIGS. 5A and 5B. The purpose of adjustaplug 660 that is located on feed conduit 500 generally at a perpendicular angle is to cause more compaction of feedstock or feed stream 615 before it enters pyrolytic vessel 300. As shown in FIGS. 5A and 5B, adjustaplug 660 extends into the side of conduit 500, and can be attached thereto in convensional manner such as by welding, nuts and bolts, and the like. The attachment angle generally is about 70° to about 110°, desirably from about 80° to about 90°, and preferably at an angle of approximately 90°. Piston 670, that is longitudinally slidable in housing 675, upon turning of threaded rod 680 can be forced into feed conduit 500. When inserted into a portion of the conduit, it reduces or restricts the area of flow through which feed stream 615 can flow and thus results in more compaction of said feed material. Conversely, upon reverse rotation of threaded rod 680, the pressure within feed conduit 500 is reduced.

Another feature of the present invention is that feed stream 615 upon leaving conduit 500 encounters very high temperatures within the initial portion of pyrolytic reactor 300 that causes the same to liquify and results in a natural formation of plug 655 that generally forms at the egress of feed conduit 500 as shown in FIG. 3 and prevents the product vapor formed in vessel 300 from flowing into feed conduit 500.

While in accordance with the patent statues, the best mode and preferred embodiment have been set forth, the scope of the invention is not limited thereto, but rather by the scope of the attached claims.

What is claimed is:

1. A plastic conversion feed system for transporting a feedstock to a reactor vessel, comprising:
   a homogenizer capable of physically breaking up said feedstock comprising plastic material or a hydrocarbonaceous material, or any combination thereof;
   a pelletizer capable of reducing the size or densifying or both reducing the size and densifying said homogenized feedstock thereby producing pelletized feedstock, wherein the pelletizer is located downstream from the homogenizer, wherein the pelletizer is operated at a temperature that ranges between ambient to about 160° F. (71.1° C.); and
   an extruder located downstream from the pelletizer and receiving the pelletized feedstock, said extruder capable of forming a continuous mass of feedstock that can be fed to said reactor vessel, wherein said extruder heats the feedstock so that the feedstock exiting extruder has a temperature that ranges from about 200° F. (93.3° C.) to about 400° F. (204.4° C.); and
   a feed conduit that extends from said extruder to said reactor vessel, wherein said feed conduit is configured to develop a vapor seal with the feedstock being fed into the reactor vessel, said vapor seal being located around said feed conduit at an entrance to said reactor vessel to prevent a product vapor formed in said reactor vessel from flowing backwards into said extruder.

2. The plastic conversion feed system of claim 1, including a shredder, said shredder capable of reducing the size of said feedstock and being located downstream from the homogenizer and upstream from the pelletizer.

3. The plastic conversion feed system of claim 2, including a heater and feeder system for heating said pelletized feedstock, said heater and feeder capable of transferring said feedstock to said extruder.

4. The plastic conversion feed system of claim 3, wherein the feed conduit is flexible, and wherein said extruder has an output axis and said conduit has an output axis of up to about a 5° radius angle with respect to the extruder device output axis.

5. The plastic conversion feed system of claim 4, including a port in a side of said feed conduit where a rod can be inserted an adjustable depth into the flow of the feedstock, thereby increasing resistance to the flow and increasing compaction of the feedstock in said feed conduit.

6. The plastic conversion feed system of claim 3, wherein said feedstock egressing from said extruder is a flowable, non-melted material.

7. The plastic conversion feed system of claim 1,
   further including a heating device capable of heating and transferring said reduced sized feedstock to the extruder.

8. The plastic conversion feed system of claim 7, wherein said size reduction device further comprises a shredder, and wherein said heating device comprises a feeder.

9. The plastic conversion feed system of claim 8, wherein said reactor vessel is a pyrolytic reactor.

10. The plastic conversion feed system of claim 8, wherein said pelletizer is capable of densifying said feedstock to greater than about 15 pounds/cubic foot.

11. The plastic conversion feed system of claim 7, wherein said heating device is part of said extruder.

12. A process for transporting a feedstock to a reactor vessel comprising:
   physically breaking up said feedstock in a homogenizer, said feedstock comprising a plastic, a hydrocarbonaceous material, or any combination thereof;
   a pelletizer, said pelletizer reducing the size of said feedstock thereby producing pelletized feedstock, wherein the pelletizer is located downstream from the homogenizer, wherein the pelletizer operates at a temperature that ranges between ambient to about 160° F. (71.1° C.);
   an extruder located downstream from the pelletizer and receiving the pelletized feedstock, and a feed conduit operatively connecting said extruder to said reactor vessel, and
   extruding said pelletized feedstock into a continuous mass of feedstock that is fed into said reactor vessel, wherein the extruder heats the pelletized feedstock so that the continuous mass of feedstock exiting the extruder has a temperature that ranges from about 200° F. (93.3° C.) to about 400° F. (204.4° C.),
   wherein said feed conduit is configured to develop a vapor seal with the feedstock being fed into said reactor vessel, said vapor seal being located around said feed conduit at an entrance to said reactor vessel to prevent a product vapor formed in said reactor vessel from flowing backwards into said extruder.

13. The process of claim 12, including adding a port in a side of said feed conduit where a rod can be inserted an adjustable depth into the flow of the feedstock, thereby increasing resistance to the flow and increasing compaction of the feedstock in said feed conduit.

14. A plastic conversion feed system for transporting a feedstock to a reactor vessel, comprising:
   a size reduction device comprising of a shredder or a pelletizer or both a shredder and pelletizer capable of reducing the size of or densifying or both reducing the size of and densifying said feedstock comprising a plastic, or a hydrocarbonaceous material, or any combination thereof;
   a heating device located downstream from the size reduction device, the heating device capable of heating the feedstock at a temperature that ranges between 200° F. (93.3° C.) to about 400° F. (204.4° C.), and transferring said reduced sized feedstock to an extruder,
   wherein the extruder is located downstream from the heating device,
   wherein the extruder heats the feedstock so that the feedstock exiting the extruder has a temperature that ranges from about 200° F. (93.3° C.) to about 400° F. (204.4° C.), said extruder having an output axis; and
   a feed conduit that extends from said extruder to said reactor vessel, wherein said feed conduit is configured to develop a vapor seal with the feedstock being fed into the reactor vessel said vapor seal being located around said feed conduit at an entrance to said reactor vessel to prevent a product vapor formed in said reactor vessel from flowing backwards into said extruder.

15. The plastic conversion feed system of claim 14, wherein said size reduction device comprises the shredder, or a and the pelletizer, or both, and wherein said heating device comprises a feeder.

16. The plastic conversion feed system of claim 15, wherein said reactor vessel is a pyrolytic reactor, and wherein the conduit has an output axis of up to about a 5° radius angle with respect to said extruder output axis.

17. The plastic conversion feed system of claim 15, wherein said size reduction device is said pelletizer, and wherein said pelletizer is capable of densifying said feedstock to greater than about 15 pounds/cubic foot.

18. A process for transporting a feedstock to a reactor vessel comprising the steps of:

reducing the size of said feedstock in a size reduction device; the size reduction device comprising of a shredder or a pelletizer or both a shredder and pelletizer, said feedstock comprising a plastic, or a hydrocarbonaceous material, or any combination thereof;

heating the feedstock at a temperature that ranges between 200° F. (93.3° C.) to about 400° F. (204.4° C.), and extruding said pelletized feedstock into a continuous mass of feedstock that is fed into said reactor vessel, wherein the extruder heats the pelletized feedstock so that the continuous mass of feedstock exiting the extruder has a temperature that ranges from about 200° F. (93.3° C.) to about 400° F. (204.4° C.), wherein said feed conduit is connected to said reactor vessel, wherein said feed conduit is configured to develop a vapor seal with the feedstock being fed into said reactor vessel, said vapor seal being located around said feed conduit at an entrance to said reactor vessel to prevent a product vapor formed in said reactor vessel from flowing backwards into said extruder, and feeding said feedstock to said reactor vessel.

19. The process of claim 18, wherein said size reduction device comprises the pelletizer.

20. The process of claim 19, wherein said reduced size of said feedstock has a density of greater than about 25 pounds/cubic foot.

21. The process of claim 19, wherein said feed conduit has an output radial axis that can vary up to about 5° with respect to the axis of said extruder.

22. The process of claim 18, including a hopper system, said hopper system comprising an upper hopper and a lower hopper, feeding said feedstock to said upper hopper, and subsequently feeding said feedstock in said upper hopper to said lower hopper, and subsequently feeding the feedstock from the lower hopper to the size reduction device.

23. The process of claim 18, wherein said feed conduit is flexible and is heated.

\* \* \* \* \*